(12) United States Patent
Safavi et al.

(10) Patent No.: US 11,536,797 B2
(45) Date of Patent: Dec. 27, 2022

(54) MOBILE NETWORK LOCALIZATION

(71) Applicant: TRUSTEES OF TUFTS COLLEGE, Medford, MA (US)

(72) Inventors: Sam Safavi, Somerville, MA (US); Usman A. Khan, Lexington, MA (US)

(73) Assignee: Trustees of Tufts College, Medford, MA (US)

( * ) Notice: Subject to any disclaimer, the term of this patent is extended or adjusted under 35 U.S.C. 154(b) by 779 days.

(21) Appl. No.: 16/347,470

(22) PCT Filed: Nov. 6, 2017

(86) PCT No.: PCT/US2017/060174
§ 371 (c)(1),
(2) Date: May 3, 2019

(87) PCT Pub. No.: WO2018/085766
PCT Pub. Date: May 11, 2018

(65) Prior Publication Data
US 2019/0277940 A1 Sep. 12, 2019

Related U.S. Application Data

(60) Provisional application No. 62/417,751, filed on Nov. 4, 2016.

(51) Int. Cl.
*G01S 5/02* (2010.01)
*H04W 64/00* (2009.01)
(Continued)

(52) U.S. Cl.
CPC .............. *G01S 5/0289* (2013.01); *G01S 5/02* (2013.01); *H04L 41/048* (2013.01); *H04W 4/029* (2018.02); *H04W 64/00* (2013.01)

(58) Field of Classification Search
CPC ........ G01S 5/0289; G01S 5/02; H04W 64/00; H04W 4/029; H04L 41/048
(Continued)

(56) References Cited

U.S. PATENT DOCUMENTS 8,174,383 B1  5/2012  Chung et al.
8,896,442 B1  11/2014  Khan et al.
(Continued)

FOREIGN PATENT DOCUMENTS

RU       2606241 C1 *  1/2017 ............... G01S 5/10
WO  WO-2005119293 A1 * 12/2005 ............. G01S 13/87

*Primary Examiner* — Harry K Liu
(74) *Attorney, Agent, or Firm* — Occhiuti & Rohlicek LLP

(57) ABSTRACT

A method localizes a first agent in a network including a number of agents, the number of agents including a number of mobile agents and one or more beacons located at known locations. The method includes performing a procedure including, receiving transmissions from a number of neighboring agents, processing the transmissions to determine information related to a relative location of the first agent and each neighboring agent of the number of neighboring agents, determining, based on the information related to the relative location of the first agent and each neighboring agent, that the first agent is within one or more proximity regions, and updating an estimated location of the first agent based on the information related to a relative location of the first agent and each neighboring agent.

16 Claims, 12 Drawing Sheets

(51) Int. Cl.
*H04W 4/029* (2018.01)
*H04L 41/046* (2022.01)
(58) Field of Classification Search
USPC .................................................. 342/463, 386
See application file for complete search history.

(56) References Cited

U.S. PATENT DOCUMENTS

2008/0204322 A1 8/2008 Oswald et al.
2008/0274750 A1 11/2008 Carlson et al.
2011/0080264 A1 4/2011 Clare et al.

\* cited by examiner

Algorithm 1 Localize $N$ robots in $\mathbb{R}^m$ in the presence of $M$ beacons with precision $p$

---

Require: $M \geq 1$ and $M + N \geq m + 2$ and $M + \dim \bigcup_{i \in \Omega} M_i + \dim \bigcup_{j \in k} U_j \geq m + 1$.

$k \leftarrow 0$ (1)   $x_0 \leftarrow$ Random initial coordinates $e_0 \leftarrow x_0^* - x_0$ (2)   while $\|e_k\|_2 \geq 10\text{-}P$ do

$k \leftarrow k +$ (3)     for $i = 1$ to $N$ do

(4)       if $0 \leq |N_i(k)| < m + 1$ then

(5)         Do not update (6)       else

(7)         Perform the inclusion test on (all possible combinations of) $m + 1$ neighbors (8)         if No triangulation set found then

(9)           Do not update

(10)        else

(11)           Update location estimate according to Eq. (8)

end if end if end for

(12)     $e_k \leftarrow x_k^* - x_k$ end while

MOBILE NETWORK LOCALIZATION

CROSS REFERENCE TO RELATED APPLICATIONS

This application is the national phase under 35 USC 371 of International Application No. PCT/US2017/060174, filed on Nov. 6, 2017, which claims the benefit of, Provisional Application Ser. No. 62/417,751, filed Nov. 4, 2016, the contents of which are hereby entirely incorporated herein by reference.

STATEMENT RESEARCH AS TO FEDERALLY SPONSORED

This invention was made with government support under grant 1350264 awarded by the National Science Foundation. The government has certain rights in the invention.

BACKGROUND

This invention relates to localization and position tracking of sensors in a sensor network, robots in multi-robot networks, things/devices in internet-of-things, and/or self-driving cars.

Localization algorithms exist for estimating and tracking the location of stationary or mobile nodes (e.g., agents such as robots, or vehicles). Types of localization algorithms include centralized localization algorithms and distributed localization algorithms. In general, centralized localization algorithms work well for small networks of nodes, but scale poorly to larger networks of nodes, are generally unreliable, and require high computational complexity compared to distributed localization algorithms.

For example, in order to navigate reliably and perform useful tasks in robotic networks, a mobile robot must know its exact location. Robot localization, estimation of a robot's location from the sensor onboard a robot, is thus a fundamental problem in providing autonomous capabilities to a mobile robot. Although some robotic systems rely on a Global Positioning System (GPS) to determine their location in a global reference frame, it is impractical to use GPS in many indoor applications.

Since the early work on navigation with autonomous mobile robots, a variety of centralized and distributed techniques have been proposed to tackle the localization problem. Robot localization approaches include but are not limited to dead-reckoning, Simultaneous Localization and Mapping (SLAM), Monte Carlo techniques, and Kalman Filtering methods.

Dead-reckoning is a common method to estimate the location of a mobile robot. It uses the wheel rotation measurements to compute the offset from a known starting position. Despite the low cost, simplicity, and ease of implementation in real time, dead reckoning methods are prone to accuracy problems due to accumulating wheel slippage errors, which grow without bound over time. Therefore, these methods are only suitable for applications where the robots have good estimates of their initial locations, and their tasks involve exploring only short distances.

When the map of the environment is not available a priori, Simultaneous Localization and Mapping techniques, can be used to build a map of an unexplored environment by a mobile robot, while simultaneously navigating the environment using the map. The main disadvantage of most SLAM algorithms is the high computational complexity, which makes them less efficient specially in larger multi-robot networks.

When ranging data is noisy, estimation-based localization techniques are widely used. Sequential Bayesian Estimation (SBE) methods use the recursive Bayes rule to estimate the likelihood of a robot's location. The solution to SBE is generally intractable and cannot be determined analytically. An alternative approach is Kalman-based techniques, which are only optimal when the uncertainties are Gaussian and the system dynamics are linear. However, localization has always been considered as a nonlinear problem and hence the optimality of Kalman-based solutions are not guaranteed.

To address the nonlinear nature of localization problems, other suboptimal solutions to (approximate the optimal Bayesian estimation) include Particle Filters (PF) and Extended Kalman Filters (EKF). In particular, Sequential Monte Carlo (SMC) method is a PF that exploits posterior probability to determine the future location of a robot. Monte Carlo Localization (MCL) algorithms can solve localization problem in a robust and efficient way. However, MCL methods are time-consuming as they need to keep sampling and filtering until enough samples are obtained to represent the posterior distribution of a mobile robot's position.

On the other hand, Extended Kalman Filter (EKF) approaches provide suboptimal solutions by linearizing the measurements around the robot's current position estimate.

SUMMARY

Aspects described herein include a distributed algorithm for determining absolute coordinates of each agent in a network of mobile agents, when no prior estimates of the initial locations of the agents are available. One exemplary scenario where the algorithm is used is a multi-robot network of ground/aerial vehicles with no central or local coordinator and with limited communication, whose task is to transport goods in an indoor facility, where GPS signals are not available. To perform a delivery task, each mobile robot has to know its own location first.

The distributed algorithm tracks the robot locations such that convergence of the algorithm is invariant to the initial location estimates. A number of challenges are addressed by aspects described herein, including the possibility that no robot is in proximity of any other robot or device with known location (hereinafter, referred to as a beacon for simplicity), a given robot may not be able to find nearby robots at all times to perform a distributed algorithm, and the dynamic neighborhood at each robot results in a time-varying distributed algorithm, whose stability (convergence) analysis is non-trivial.

In a general aspect, a method localizes a first agent in a network including a number of agents, the number of agents including a number of mobile agents and one or more beacons located at known locations. The method includes performing a procedure including, receiving transmissions from a number of neighboring agents, processing the transmissions to determine information related to a relative location of the first agent and each neighboring agent of the number of neighboring agents, determining, based on the information related to the relative location of the first agent and each neighboring agent, that the first agent is within one or more proximity regions, and updating an estimated location of the first agent based on the information related to a relative location of the first agent and each neighboring agent.

Aspects may include one or more of the following features.

The method may include determining that a number of neighboring agents in the number of neighboring agents exceeds a threshold required to form the one or more proximity regions. The information related to the relative location of the first agent and each neighboring agent may include distance information. The information related to the relative location of the first agent and each neighboring agent may include directional information. Each proximity region may be formed as a convex hull formed according to locations of three or more agents of the number of neighboring agents.

The method may include repeatedly performing the procedure until an error threshold is met. The method may include maintaining, at each mobile agent, an estimate of a direction and distance traveled location relative to a previous location. The previous location may be an initial location. At least one of the proximity regions may be determined based on a location of a first neighboring agent of the number of neighboring agents at a first time and a location of a second neighboring agent of the number of neighboring agents at a second time.

At least one agent of the number of neighboring agents may be a beacon. Determining whether the first agent is included in one or more proximity regions may include determining barycentric coordinates of the first agent in the one or more proximity regions. The one or more beacons may consist of a single beacon. The one or more proximity regions may include a number of proximity regions. Updating an estimated location of the first agent may include performing a linear update operation. The linear update operation may include a linear-convex combination of the information related to a relative location of the first agent and each neighboring agent. At least some beacons of the one or more beacons may be located at a fixed location.

Aspects may have one or more of the following advantages.

Among other advantages, aspects address the challenges of distributed localization by using opportunistic update scenario, where a robot updates its location estimate in m-dimensional Euclidean space only if it lies inside the convex hull of m+1 neighboring robots and/or beacons. Such neighbors are referred to as a triangulation set. Using this approach, robot location estimates are improved as the procedure continues and the algorithm is optimal, i.e., it tracks the true robot locations. Aspects also advantageously provide a linear framework for localization that enables circumvention of challenges posed by the predominant nonlinear approaches to the localization problem. The linear framework is not a linearization of an existing nonlinear algorithm. Instead, the nonlinearity from range to location is embedded in an alternate representation provided by barycentric coordinates.

DESCRIPTION OF DRAWINGS

FIG. 3 is a distributed localization algorithm.

DESCRIPTION

Figure 1:
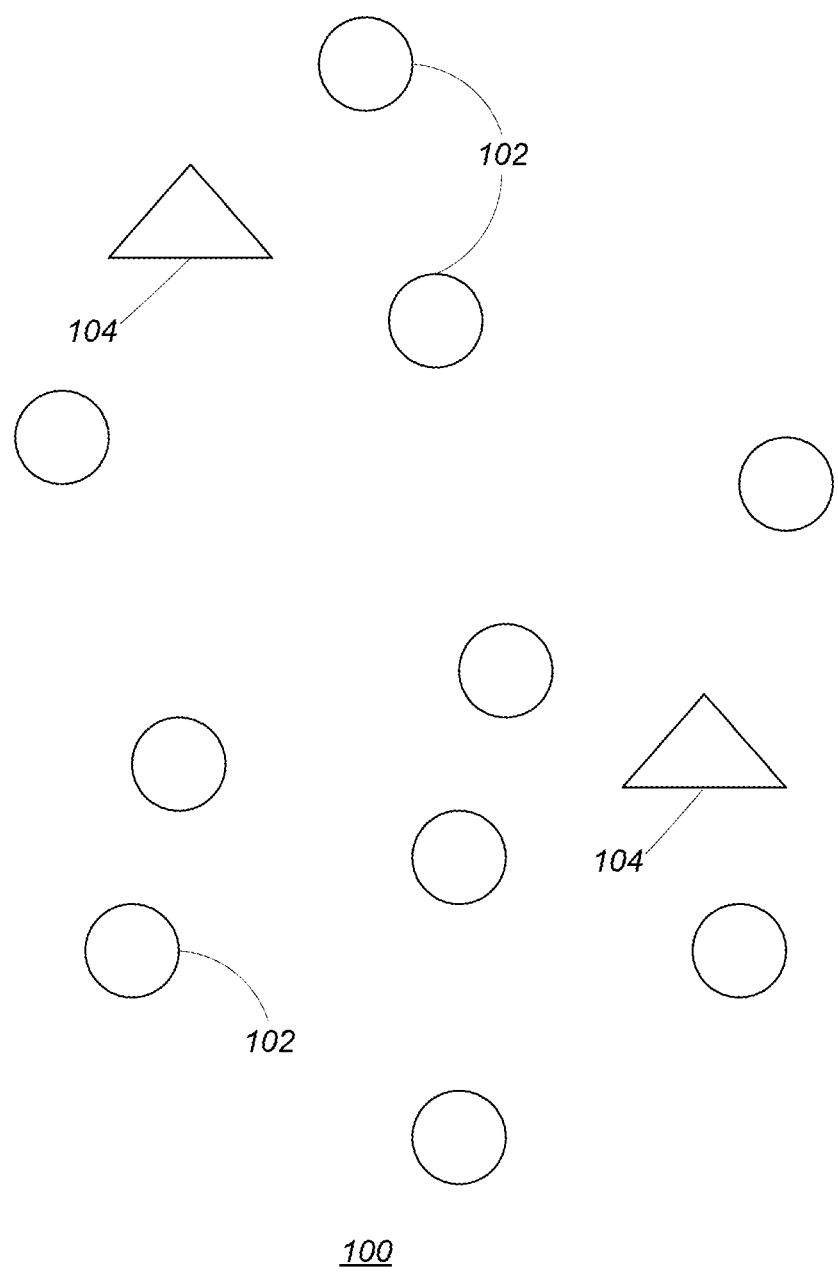
FIG. 1 is an embedding of a network of mobile agents and beacons.

Referring to FIG. 1, a network 100 includes a number, N of robots 102 (or other agents, such as vehicles) and a number, M of beacons 104 (e.g., stationary agents with known locations) each embedded in an m-dimensional space (e.g., an in =2 or m=3 dimensional space). In general, some or all of the robots 102 and beacons 104 may be mobile. In general, the initial locations of the robots 102 are unknown and the initial locations of the one or more beacons 104 are known. Aspects described herein relate to a number of approaches to localization of the robots 102 in the network 100. It should be understood that each of the aspects can be used alone or in combination with the other aspects.

In some examples, a distributed algorithm is used to determine localization of the robots 102. In the distributed algorithm, each of the robots 102 measures a possibly noisy version of its motion (e.g., using dead reckoning techniques) and a possibly noisy version of its relative location (e.g., distance and/or direction) to neighboring robots (e.g., using Received Signal Strength Indicator (RSSI), Time of Arrival (TOA), Time Distance of Arrival (TDoA), or camera based techniques). The distributed algorithm iteratively and linearly updates the locations of the robots based on the measured motion of the robots and the measured distances between the robots. One version of the equation for updating the location estimates for the robots 102 is:

$$x_{k+1}^i = \alpha_k x_k^i + (1-\alpha_k)\sum_{j\in\Theta_i(k)} a_k^{ij} x_k^j + \tilde{x}_{k+1}^i$$

In the above equation, $x_k^j$ is the location estimate of an $i^{th}$ robot at a time k, $\Theta_i(k)$ represents a triangulation set consisting of the nodes that form a convex hull in which the $i^{th}$ robot is located at time k, $a_k^{ij}$ are the barycentric coordinates of the $i^{th}$ robot with respect to the $j^{th}$ node of the convex hull in which the $i^{th}$ robot is located at time k, and $\alpha_k$ is a parameter defined as:

$$\alpha_k = \begin{cases} 1, & \forall k \mid \Theta_i(k) = \emptyset, \\ \in [\beta, 1), & \forall k \mid \Theta_i(k) \neq \emptyset, \end{cases}$$

where $\beta$ is a design parameter.

For each of the robots 102, the update equation shown above is applied only when the robot lies within a convex hull of m+1 neighbors (i.e., robots, beacons, or a mixture of robots and beacons), where m is the dimension of the space in which the robot's location is being determined. That is, if m=3, the location of a given robot is being determined in three dimensions, so the robot must exist in a convex hull of four neighbors for an update of the robot's location to be performed. Generally, the convex hull inclusion test is defined as:

$$i \in C(\Theta_i(k)), \text{ if } \sum_{j \in \Theta_i(k)} A_{\Theta_i(k) \cup \{i\} \setminus j} = A_{\Theta_i(k)}$$

$$i \notin C(\Theta_i(k)), \text{ if } \sum_{j \in \Theta_i(k)} A_{\Theta_i(k) \cup \{i\} \setminus j} > A_{\Theta_i(k)}$$

where $C(\bullet)$ denotes a convex hull, i denotes the $i^{th}$ robot, "\" denotes the set difference, and $A_{\Theta_i(k)}$ represents the m-dimensional volume or area of $C(\Theta_i(k))$.

The true location of the $i^{th}$ robot with respect to the neighboring robots of the triangulation set $\Theta_i(k)$ is represented using barycentric coordinates as follows:

$$x_k^{i^*} = \sum_{j \in \Theta_i(k)} a_k^{ij} x_k^{j^*}$$

where $x_k^{i^*}$ is the location of robot i at time k and the $a_k^{ij}$'s are barycentric coordinates defined as:

$$a_k^{ij} = \frac{A_{\Theta_i(k) \cup \{i\} \setminus j}}{A_{\Theta_i(k)}}.$$

Based on the above, the location update formula includes a linear-convex combination of the locations of the neighboring robots of the triangulation set $\Theta_i(k)$ rather than a complex nonlinear function. Since the update equation is linear, the distributed localization algorithm is guaranteed to converge on the locations of the robots regardless of the initial conditions (i.e., the initial location estimates for the robots).

1 Inclusion Test

Figure 2A:
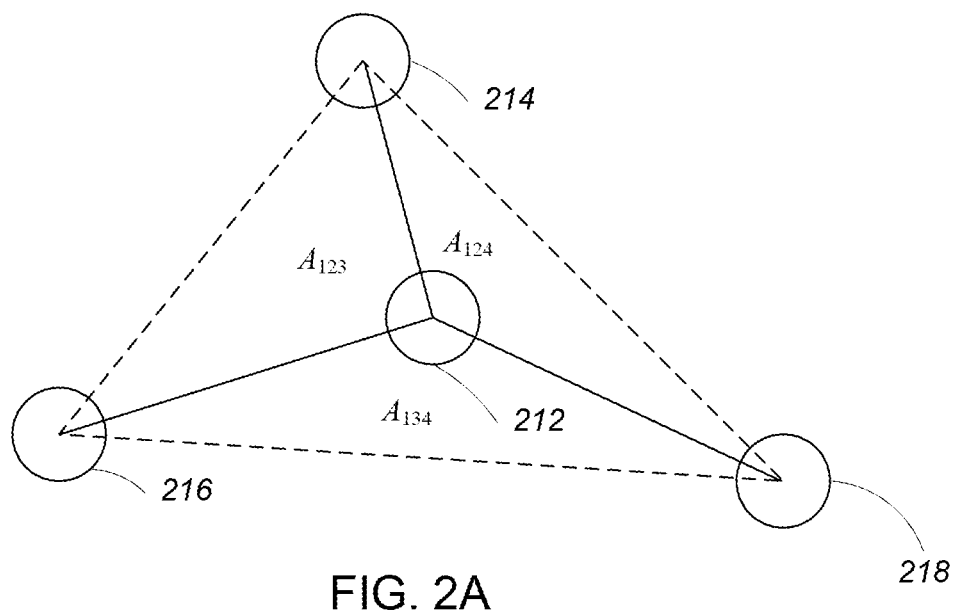
FIG. 2A is a mobile agent inside a convex hull.

Referring to FIG. 2A, in one example, to determine whether the $i^{th}$ robot lies within a convex hull, the inclusion test described above is performed. Very generally, for a given embedding of robot locations in an in-dimensional space using the distances between the robots, the inclusion test determines whether any of the robots neighboring the $i^{th}$ robot (i.e., a set of neighbors, $\mathcal{N}_i^k$) form a convex hull around the $i^{th}$ robot.

Figure 2B:
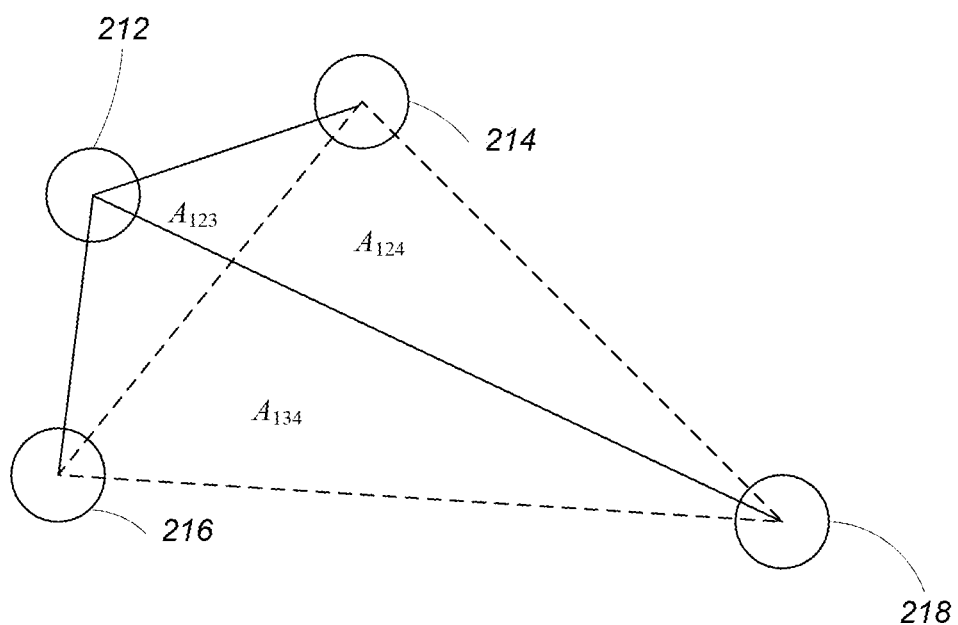
FIG. 2B is a mobile agent not inside any convex hull.

In an exemplary two-dimensional case, a convex hull can be formed as a triangle with three of the $i^{th}$ robot's neighbors at its vertices. For example, in the exemplary embedding of FIG. 2A, a part of a network of robots 210 includes a first robot, R1 212, a second robot, R2 214, a third robot, R3 216, and a fourth robot, R4 218. To perform an inclusion test for the first robot, R1 212, the area, $A_{234}$ of the triangle with the set of the first robot's neighbors, $\mathcal{N}_i^k$ (i.e., the second robot, R2, the third robot, R3, and the fourth robot, R4) at its vertices is computed. For each unique pair of the first robot's neighbors (i.e., (R2, R3), (R2, R4), and (R3, R4)) an area of triangle with the pair of neighbors and the first robot, R1 is computed, resulting in three areas, $A_{123}$, $A_{124}$, and $A_{134}$. If $$A_{123} + A_{124} + A_{134} = A_{234}$$

then the first robot, R1 212 is included in the convex hull formed by the second robot, R2 214, the third robot, R3 216, and the fourth robot, R4 218 (as is shown in FIG. 2A). If $$A_{123} + A_{124} + A_{134} > A_{234}$$

then the first robot, R1 212 is not included in the convex hull formed by the second robot, R2 214, the third robot, R3 216, and the fourth robot, R4 218 (as is shown in FIG. 2B)

As the number of dimensions, m in the system changes, the inclusion test also changes. For example, in a three-dimensional case, the convex hulls are formed as tetrahedrons and the inclusion test includes a comparison similar to that described for the two-dimensional case but using volumes rather than areas.

2 Determination of Embedding

In general, to perform the above-described inclusion test, an embedding of the $i^{th}$ robot and its neighbors needs to be known (either explicitly or implicitly). In some approaches, the distances and angles (relative to a common reference frame) between the $i^{th}$ robot and its neighbors as well as the distances and angles between each pair of the neighbors are known to the $i^{th}$ robot. With both distances and angles known, the embedding of the $i^{th}$ robot and its neighbors is easily obtained.

In one aspect, only the pairwise distances between the $i^{th}$ robot and its neighbors and the pairwise distances between each pair of the $i^{th}$ robot's neighbors are known (i.e., the angles between the robots are unknown), resulting in $N^2$ pairwise distances, where N is the number of robots in the neighborhood, including the $i^{th}$ robot.

With only pairwise distances between the robots known, determination of the embedding of the nodes can be characterized as the distance geometry problem. Any one of a number of techniques for estimating a solution to the distance geometry solution can be used to determine an embedding of the nodes. Once an embedding is determined, the inclusion test described above can be used to identify if a given robot is in a given convex hull. It is noted, however that with only the $N^2$ pairwise distances available, there are insufficient degrees of freedom for determining a unique embedding of the robots. For example, rigid transformations such as rotations and reflections of the embedding are possible. The inclusion test is unaffected by such rigid transformations and is able to determine a set of zero or more convex hulls from the embedding.

In some aspects, the step of determining an explicit embedding for the robots in the m-dimensional space is bypassed and the areas or volumes associated with a robot and a convex hull required for performing the inclusion test are determined directly from the pairwise distances between the it robot and the robots that make up the convex hull. One way of determining the areas or volumes includes finding the Cayley-Menger determinant for each convex hull that can be made from the $i^{th}$ robot and the robots of the $i^{th}$ robot's set of neighbors, $\mathcal{N}_i^k$.

In particular, the Cayley-Menger determinant is able to find an area or volume of a convex hull given the pairwise distances between the m+1 vertices of the convex hull. Thus, to determine the areas or volumes required to perform the inclusion test for a given set of neighbors, $\mathcal{N}_i^k$ and an $i^{th}$ robot, the Cayley-Menger determinant is used to find:

The area or volume associated with the convex hull formed by the set of neighbors, $\mathcal{N}_{1\,i}^{k}$ of the $i^{th}$ robot, and The areas or volumes associated with each convex hull that can be formed by the $i^{th}$ robot and a unique combination of m neighbors selected from the set of neighbors, $\mathcal{N}_{1\,i}^{k}$.

The above areas or volumes determined by the Cayley-Menger determinant are used to perform the inclusion test to determine whether the $i^{th}$ robot is included in the given set of neighbors, $\mathcal{N}_{1\,i}^{k}$. If the inclusion test passes, the set of neighbors, $\mathcal{N}_{1\,i}^{k}$ form a triangulation set, $\Theta_i(k)$.

3 Algorithm

Referring to FIG. 3, in one example, the distributed localization algorithm starts by initializing each of the N robots with a random coordinate at (1). A while loop (2) runs while an error value $\|e_k\|_2$ (where e.g., $\|e_k^i\|_2 = \sqrt{(x_k^i - x_k^{i*}) - (y_k^i - y_k^{i*})}$) exceeds a predetermined threshold. For each execution of the while loop, a for loop (3) iterates through the N robots and, for each of the robots a test (4) is performed to determine if the robot has fewer than m+1 neighbors (where in is the number of dimensions in which the localization algorithm operates). If the test determines that the robot has fewer than m+1 neighbors, then the location of the robot is not updated (5). Otherwise, if the robot has greater than or equal to m+1 neighbors (6), the inclusion test is performed on all possible combinations of the robot's neighbors (7). If no triangulation set is found for the combinations of the robot's neighbors (8), then no location update is performed for the robot (9). If at least one triangulation set is identified for the robot (10), then the robot's location is updated (11). After the for loop (3) completes iterating through the N robots, the error value, $e_k$ is updated (12) and is then used to determine whether the while loop (2) continues.

4 Example

Figure 4:
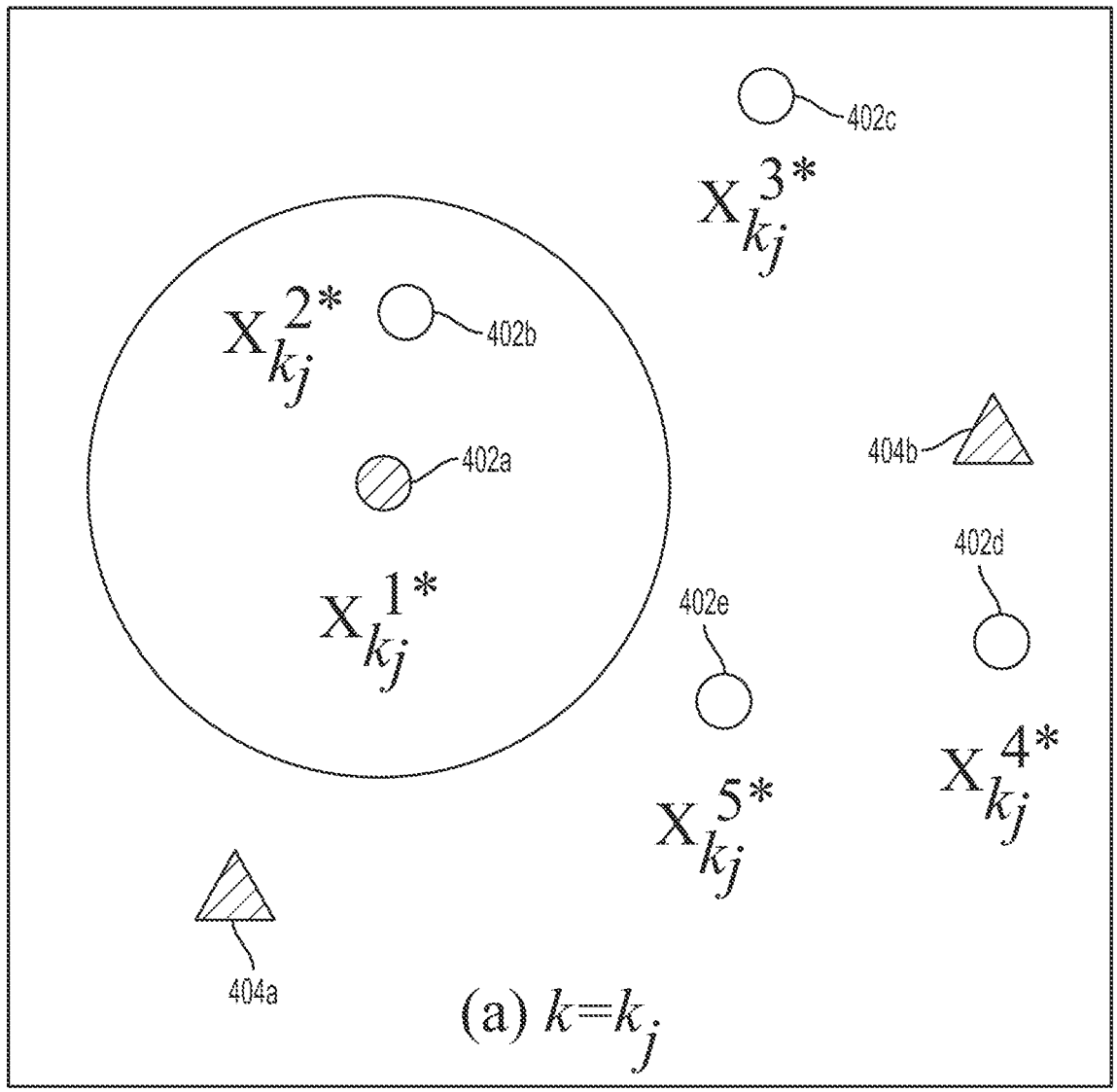
FIG. 4 is an embedding of a network of mobile agents and beacons at a first time.

Referring to FIG. 4, a network includes five mobile robots 402a-402e and two beacons 404a-404b with fixed locations in a two-dimensional environment (i.e., m=2). A first robot 404a has a single neighbor (i.e., robot 402b) at time $k=k_j$ and therefore does not update its location according to step (4) the algorithm of FIG. 3 (i.e., there are fewer than 3 neighbors).

Figure 5:
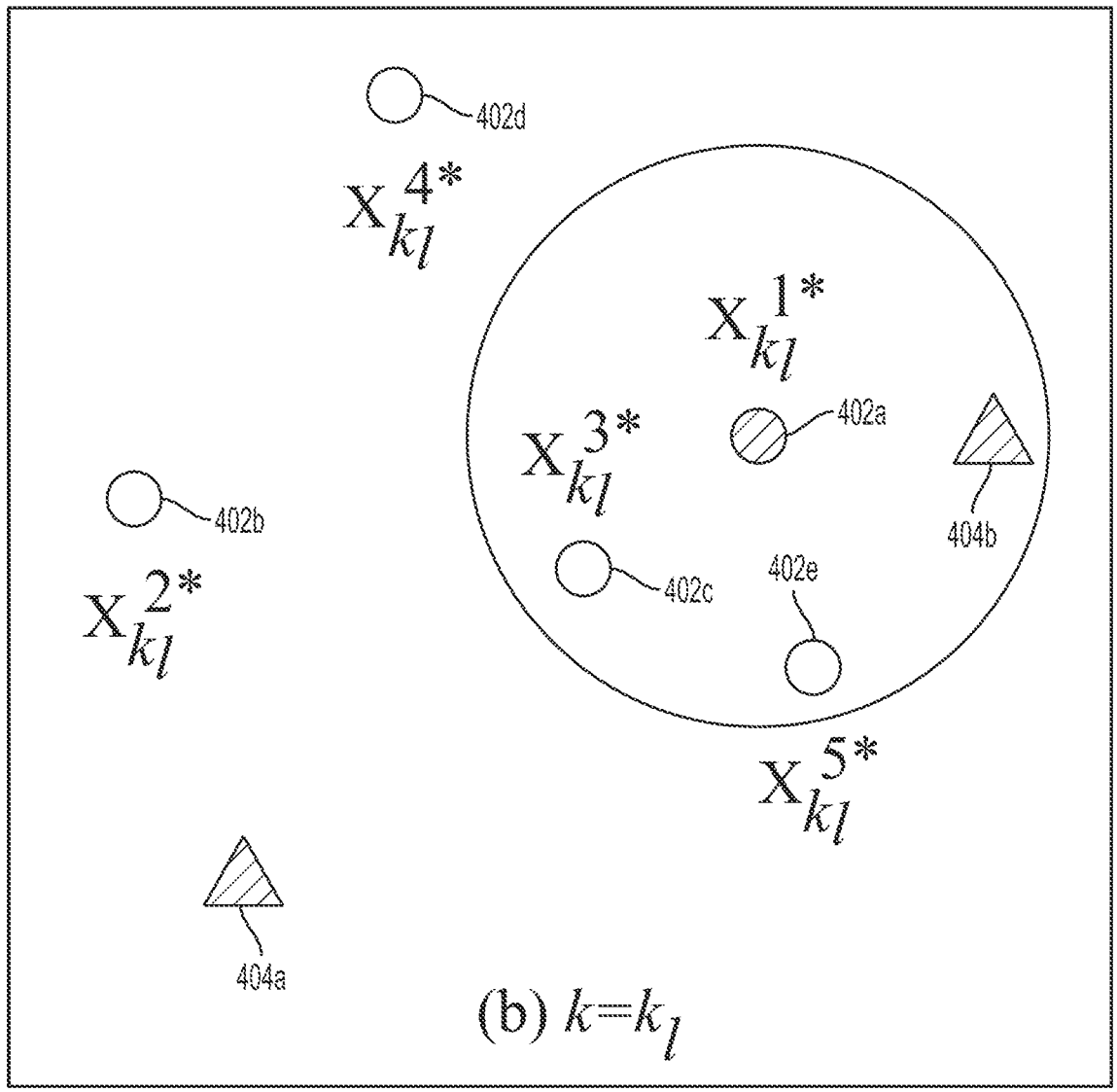
FIG. 5 is an embedding of a network of mobile agents and beacons at a second time.

Referring to FIG. 5, at time $k=k_l$, the first robot 402b has three neighbors (i.e., robot 402c, robot 402d, and beacon 404b) and therefore proceeds to step (7) of the algorithm of FIG. 3 and performs the inclusion test. Since the first robot 402a is not in a convex hull defined by its three neighbors at time $k=k_l$, no triangulation set is found, and the no location update is performed at step (9) of the algorithm of FIG. 3.

Figure 6:
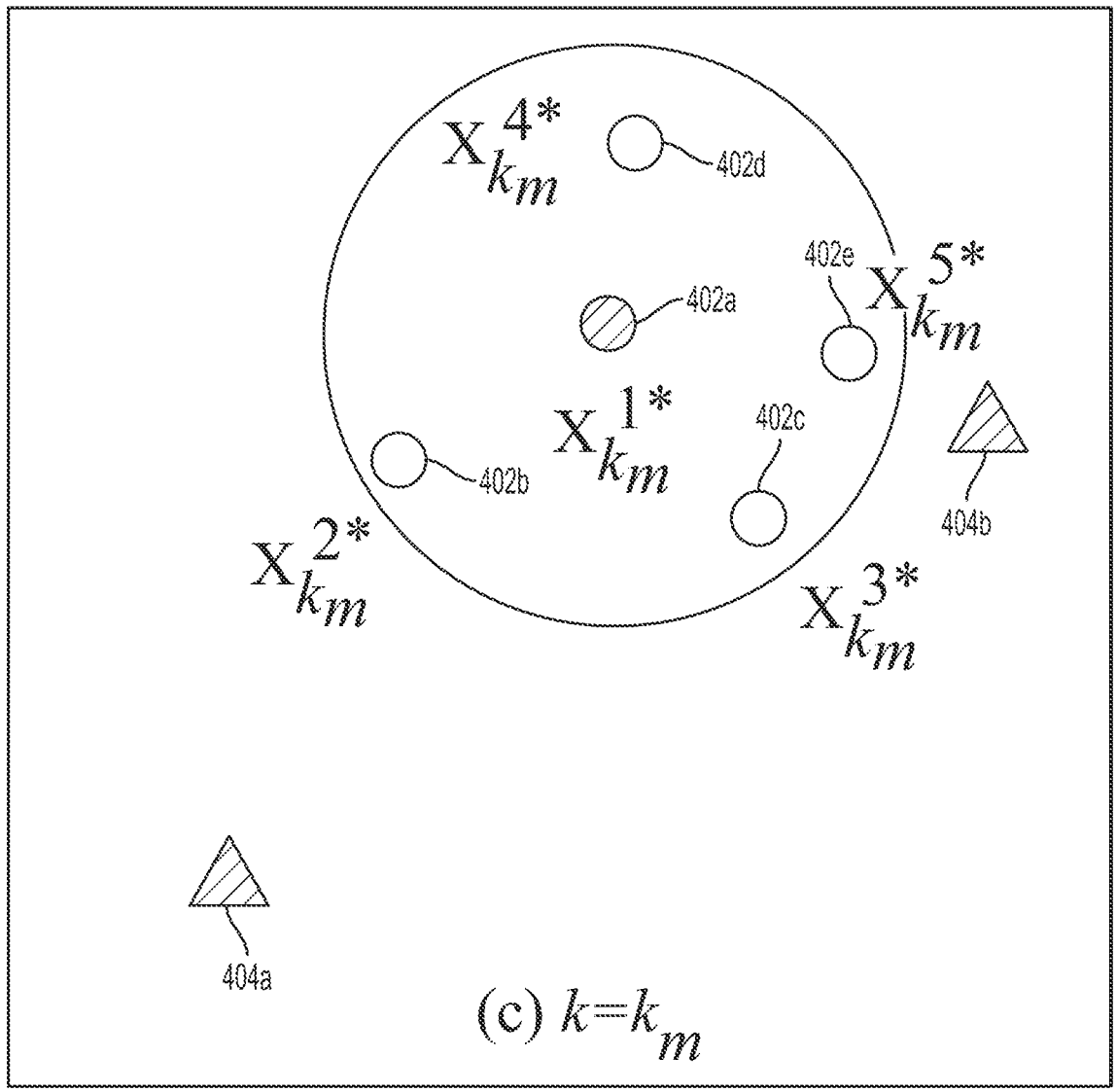
FIG. 6 is an embedding of a network of mobile agents and beacons at a third time.

Referring to FIG. 6, at time $k=k_m$, the first robot 402a has four neighbors (i.e., robot 402b, robot 402c, robot 402d, and robot 402e) and therefore proceeds to step (7) of the algorithm of FIG. 3 and performs the inclusion test for the groups {robot 402b, robot 402c, robot 402d}, {robot 402b, robot 402d, robot 402e}, {robot 402c, robot 402d, robot 402e}, and {robot 402a, robot 402c, robot 402d}. Since the first robot 420a is only included in the triangulation sets defined by the groups {robot 402b, robot 402c, robot 402d}, {robot 402b, robot 402d, robot 402e}, a location update is performed for the robot 402a according to those two groups at step (11) of the algorithm of FIG. 3.

Figure 7:
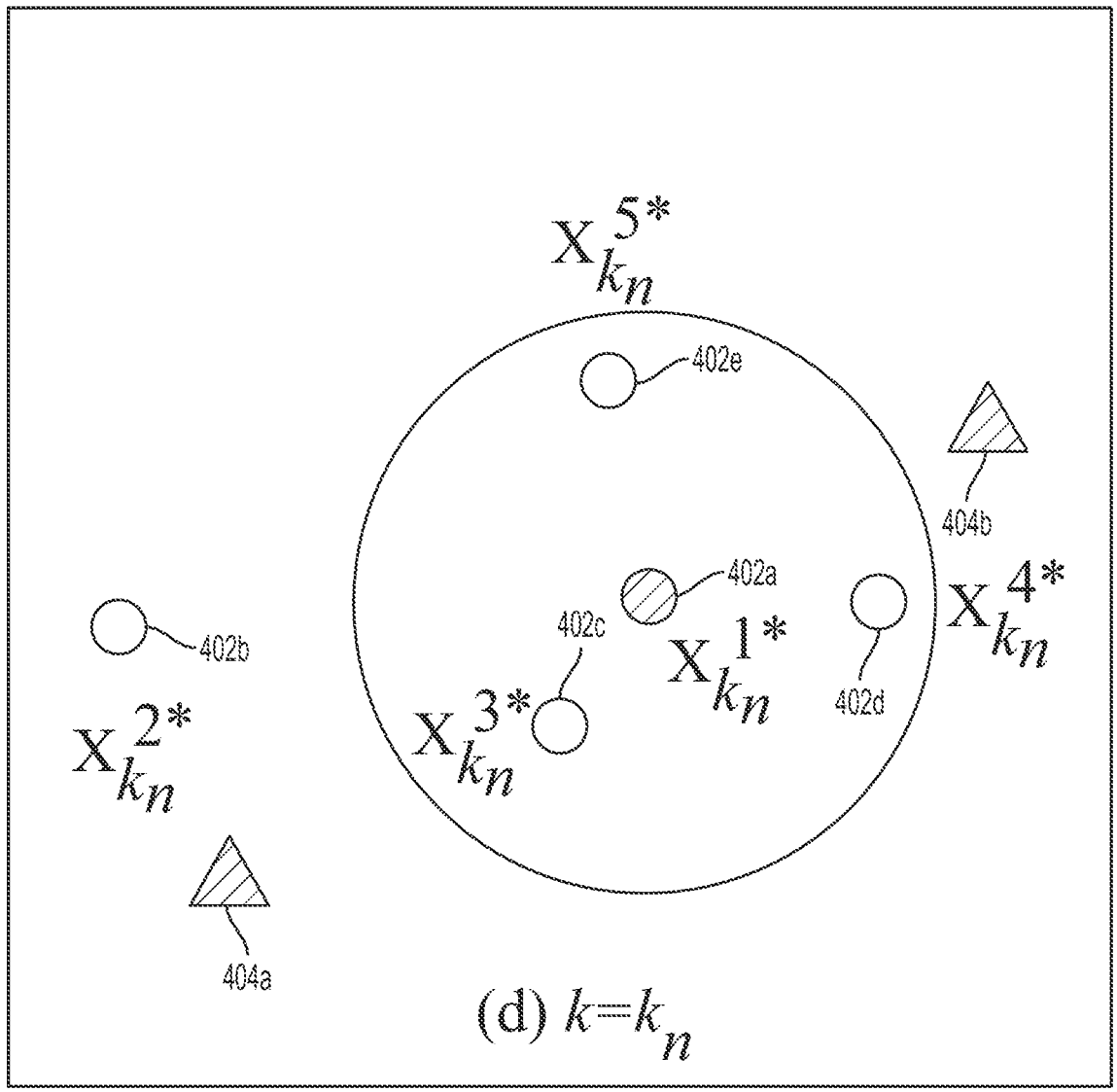
FIG. 7 is an embedding of a network of mobile agents and beacons at a fourth time.

Referring to FIG. 7, at time $k=k_n$, the first robot 402a has three neighbors (i.e., robot 402c, robot 402d, and robot 402e) and therefore proceeds to step (7) of the algorithm of FIG. 3 and performs the inclusion test. Since the first robot 402a is in a triangulation set defined by robot 402c, robot 402d, and robot 402e, a location update is performed for the first robot 402a according to the triangulation set at step (11) of the algorithm of FIG. 3.

5 Minimum Beacon Contribution

Since true information is only injected into the network by the beacons, a strictly positive lower bound must be assigned to the weights corresponding to the beacons. Otherwise, the beacons may be assigned a weight that goes to zero over time, i.e., the beacons eventually are excluded from the network.

Figure 8A:
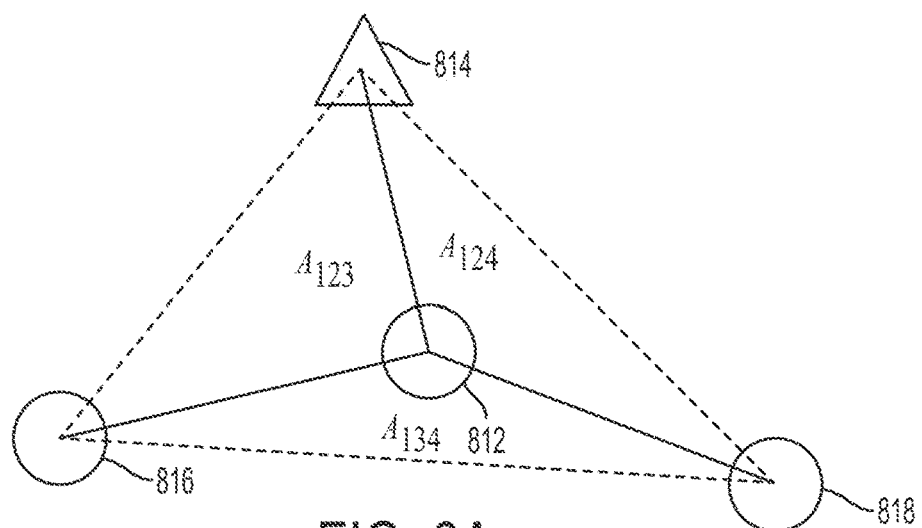
FIG. 8A-8C illustrate a minimum beacon contribution scheme.
Figure 8B:
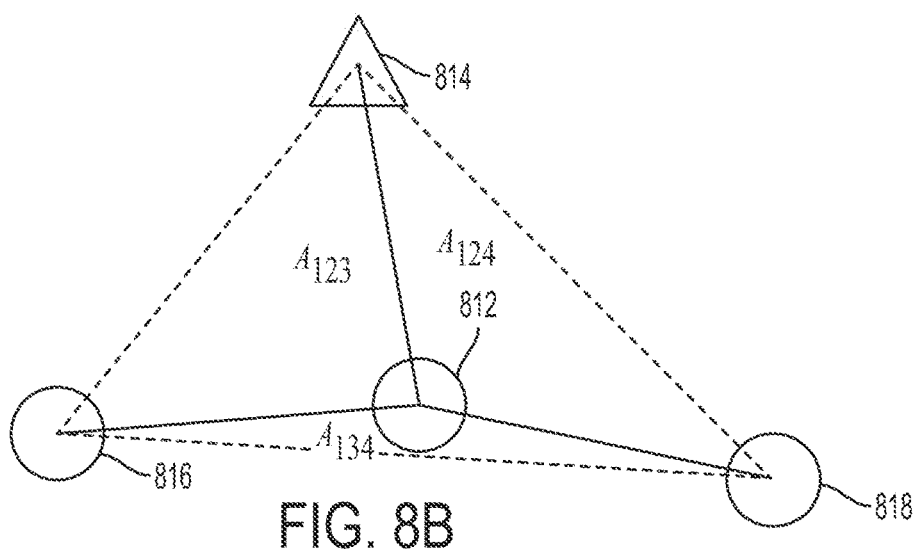
Figure 8C:
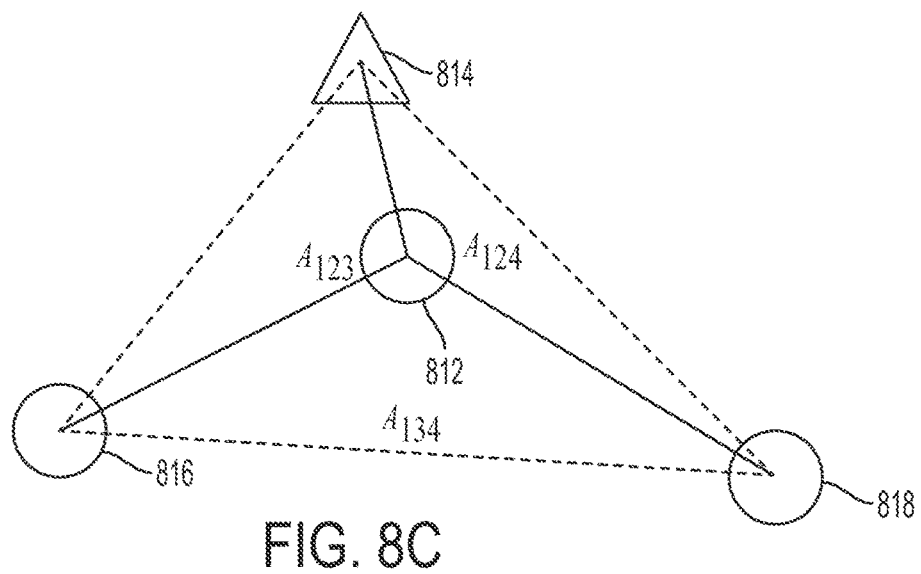

For example, referring to FIG. 8B, in one exemplary embedding, a part of a network of robots 810 includes a first robot, R1 812, a beacon, B1 814, a third robot, R3 816, and a fourth robot, R4 818. The first robot is included in a convex hull defined its neighbors, $\mathcal{N}_1^k$ (i.e., the beacon, B1 814, the third robot, R3 816, and the fourth robot, R4 818).

When the first robot, R1 812 attempts to update its location, the area A134 indicates that a contribution to the location estimate for the first robot, 812 made by the beacon, B1 814 is equal to a predefined minimum allowed value. For example, A134 equals ¼ of the total area of the convex hull, and the predefined minimum allowed contribution value is $\alpha=0.25$. The first robot, R1 812 is allowed to update its location estimate.

Referring to FIG. 8B, in a different embedding, when the first robot, R1 812 attempts to update its location, the area A134 indicates that a contribution to the location estimate for the first robot, R1 812 made by the beacon, B1 814 is less than the predefined minimum value. For example, A134 makes up ⅛ of the total area of the convex hull, and the predetermined minimum allowed contribution value is $\alpha=0.25$. The first robot, R1 812 is not allowed to update its location estimate.

Referring to FIG. 8B, in a different embedding, when the first robot, R1 812 attempts to update its location, the area A134 indicates that a contribution to the location estimate for the first robot, R1 812 made by the beacon, B1 814 is greater than the predefined minimum value. For example, A134 makes up ½ of the total area of the convex hull, and the predetermined minimum allowed contribution value is $\alpha=0.25$. The first robot, R1 812 is allowed to update its location estimate.

6 Virtual Convex Hulls

In another aspect, the location of a given robot is updated even though it is never physically present in a convex hull. For example, the robot may never be in the vicinity of a sufficient number of neighboring robots for performing the inclusion test (i.e., the robot only ever encounters fewer than m+1 neighbors). Even in the case where the robot does encounter m+1 or greater neighbors, it may never pass the inclusion test.

The concept of virtual convex hulls relies on the fact that a robot may encounter a number of other robots over time. While at no time is the robot ever physically present inside a convex hull, it can store distance and angle information from its encounters with other robots over time and build a convex hull out of that stored history information. Such a convex hull is referred to as a virtual convex hull since all of the robots whose past distance and angle information is used to build this convex hull may have traveled to arbitrary locations in the network. The robot also maintains a record of its motion such that when the robot moves into a virtual convex hull, it is able to perform an update of its location as if it were inside an actual physical convex hull.

Figure 9:
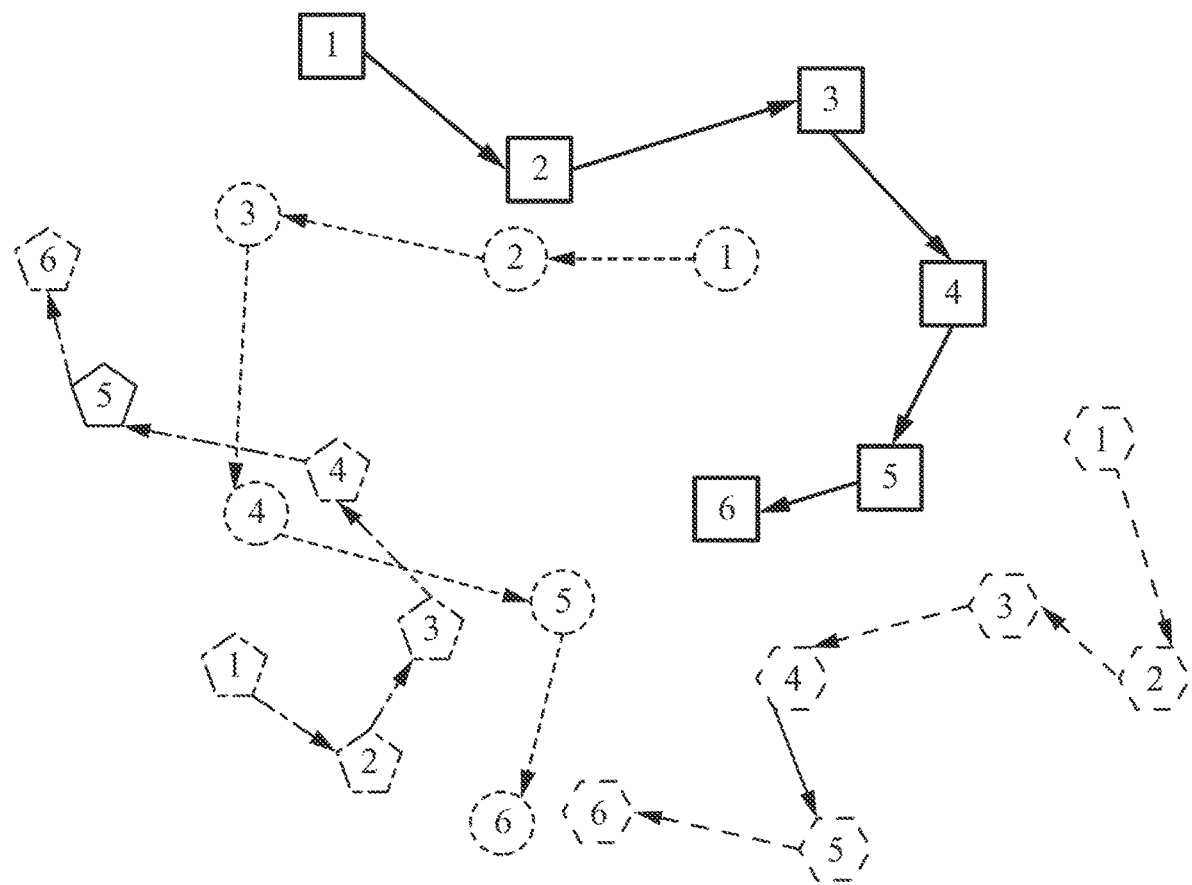
FIG. 9 is location progression of mobile agents over time in a network.
Figure 10:
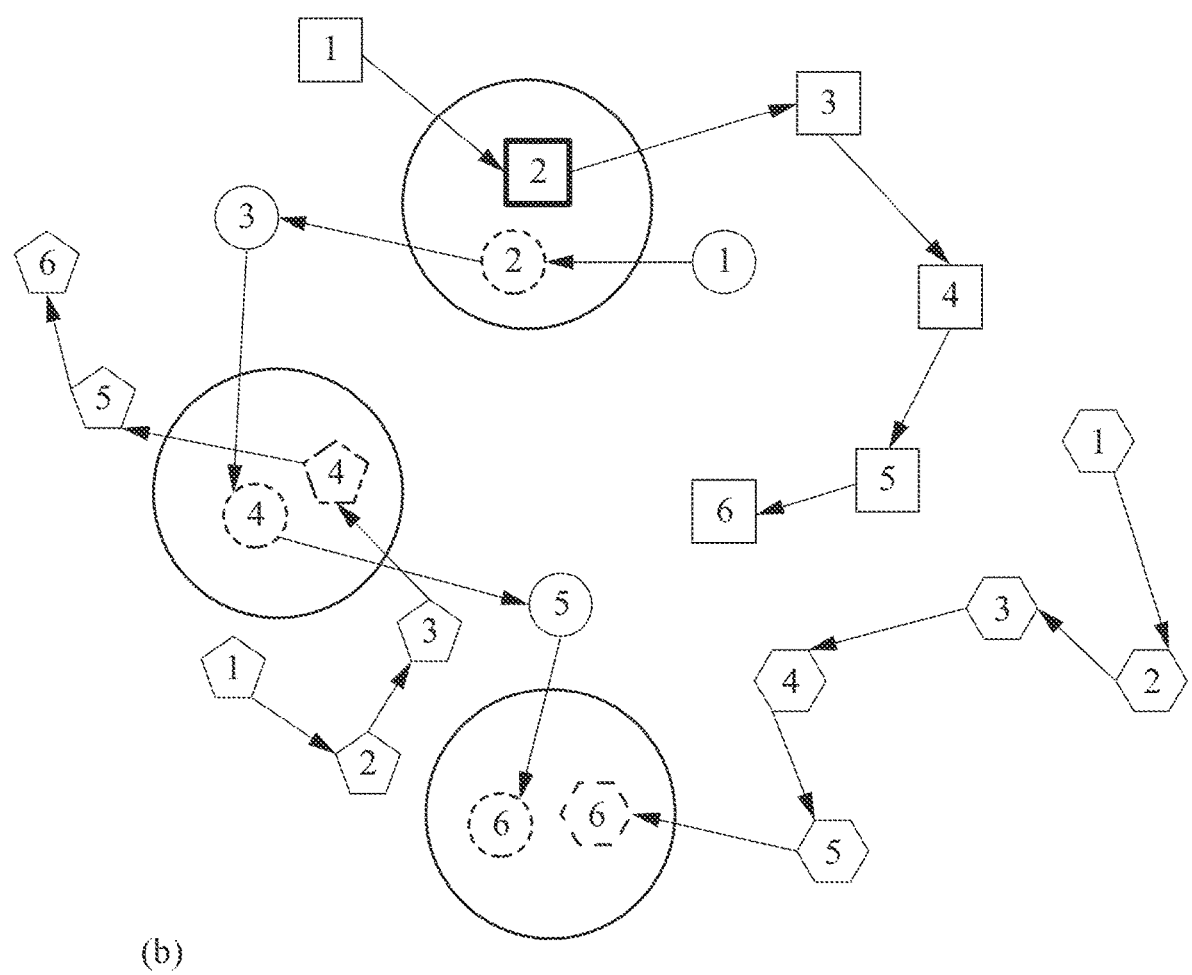
FIG. 10 is a first step in a virtual convex hull formation procedure for the location progression of FIG. 8.

For example, referring to FIG. 9, four agents represented by the symbols: □, ○, ◇, ◯, move through time steps k=1 ... 9 (with the time-indices marked inside the robot symbols). Referring to FIG. 10, from the perspective of robot ○, the robot first makes contact (i.e., communicates) with robot □, at time k=2, and then they both move apart. Next, robot ○ makes contact with robot, ◇ at k=4, and robot ◯ at k=6.

Figure 11:
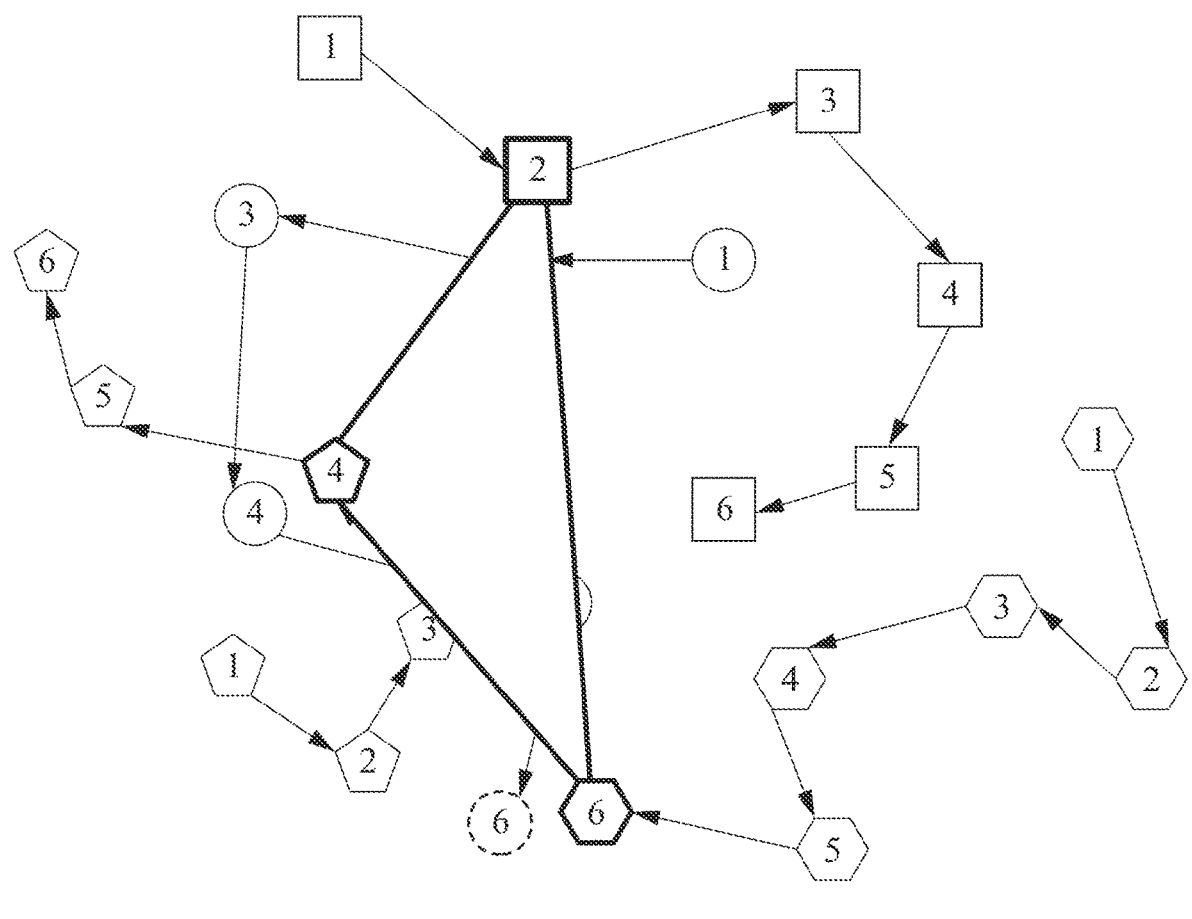
FIG. 11 is a second step in a virtual convex hull formation procedure for the location progression of FIG. 8.

Referring to FIG. 11. at k=6, a non-trivial virtual convex hull including V○(2)={□}, V○(4)={□, ◇}, and V○(6)= {□, ◇, ◯}, becomes available. However, robot ○ does not lie in corresponding convex hull, (V ○(6)), and cannot update its location estimate with the past estimates of its neighbor's locations.

Figure 12:
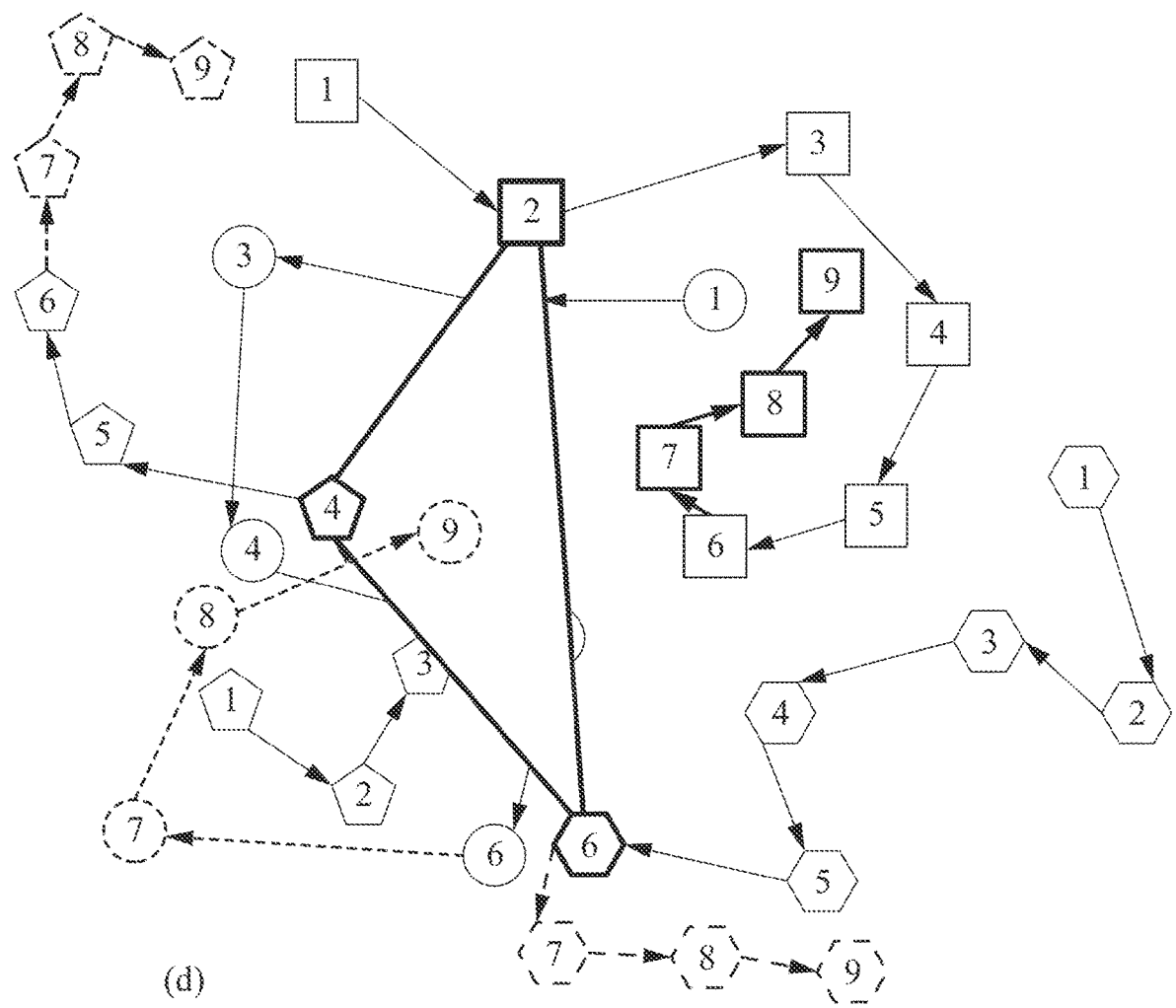
FIG. 12 shows a mobile agent entering the virtual convex hull of FIG. 11.

Robot ○ must therefore wait until it either moves inside the convex hull of □, ◇◯ or finds another agent with which the convexity condition is satisfied. For example, referring to FIG. 12, robot ○ has moved inside C(V○(6)) and can update its location based on the past estimates associated with the convex hull and with the robot's estimate of its own motion since it encountered the robots that made up the convex hull.

7 Localization with a Single Beacon

In another aspect, localization is possible in a network with a single beacon, given that the beacon and the robots are mobile. In particular, with only a single, stationary beacon, the localization algorithm would not be able to fully resolve the location of the robots due to an inability to resolve an angle of rotation of the robot locations about the beacon's known location. However, since the robot is mobile, a vector of its motion can be used to resolve the angle of rotation of the robot locations about the beacon's known location.

For example, a subspace of motion at robot, $i \in \Omega$, and beacon $j \in k$ is denoted by $\mathcal{M}_i$ and $\mathcal{U}_j$, respectively. Suppose a robot 1 is moving along a vertical line. This line forms $\mathcal{M}_1$, and dim $\mathcal{M}_1=1$. Note that $\mathcal{M}_i$ or $\mathcal{U}_j$ includes all possible locations that the $i^{th}$ robot or the $j^{th}$ beacon occupies throughout the localization process, i.e., discrete times k=1, 2, .... Now consider another robot 2, which is moving along a vertical line parallel to $\mathcal{M}_1$. In this case $\dim \cup_{i=1,2} \mathcal{M}_i = \dim \mathcal{M}_2 = 1$. However, if the two lines are linearly independent, they span $\mathbb{R}^2$, and have $\dim \cup_{i=1,2} \mathcal{M}_i = \dim \mathcal{M}_2 = 2$.

Assuming $\mathbb{R}^m$, the motion of the robots and beacons in $l \leq m$ dimensions allows reduction of the number of beacons from m+1 by l. Note that the traditional trilateration scheme requires at least 3 nodes with known locations in $\mathbb{R}^2$. Therefore, assuming m+1 beacons in $\mathbb{R}^m$ has been standard in many conventional multilateration-based localization algorithms. Aspects described herein provide robots with up to m degrees of freedom in their motion in $\mathbb{R}^m$, and the localization algorithm works in the presence of only one (i.e., m+1−m) beacon.

8 Noise Mitigation

In some examples, the techniques used to measure the distances (and possibly angles) between the robots in the network are noisy which can result in unbounded errors in the location estimates of the robots in the network. When an inclusion test is performed to determine whether an $i^{th}$ robot is in a convex hull due to the noise in distance/motion measurements, there is a possibility that the $i^{th}$ robot will be erroneously classified as being included (or excluded) in the convex hull. For example, if the $i^{th}$ robot is located within a range of the error in the boundary of the convex hull. In some aspects, the error in the boundary of the convex hull is estimated (e.g., based on an estimate of the measurement noise) and the $i^{th}$ robot's location estimate is updated only if the robot is not in the range of the convex hull's boundary error.

In some examples, two different models are used to examine the effects of noise on the localization algorithm. First, the noise on odometry measurements (i.e., the distance and angle that robot i travels at time k) is assumed to be Gaussian with zero mean and the following variances:

$$\sigma_d^{i2} = K_d^2 D_k^i, \sigma_\theta^{i2} = K_\theta^2 D_k^i$$

where $D_k^i$ represents the total distance that robot i has traveled up to time k. The noise on the distance measurement (to a neighboring robot) is assumed at time k to be normal with zero mean and the variance of $\sigma_r^{i2} = K_r^2$ k. Therefore, the variances of the odometry measurements are proportional to the total distance a robot has traveled, and the variance on the distance measurements (to the neighboring robots) increases with time. For a network with one beacon and 100 robots, setting $K_d = K_\theta = K_r = 5*10^{-3}$ leads to an unbounded error, which is due to incorrect inclusion test results and the continuous location drifts because of the noise on the distance measurements and the noise on motion, respectively. However, for aspects of the algorithm that are modified to ensure that the $i^{th}$ robot's location estimate is updated only if the robot is not in the range of the convex hull's boundary error, localization error is bounded by the communication radius. In a simulation with noise $\varepsilon = 20\%$, i.e., a robot performs an update only if the relative inclusion test error, corresponding to the candidate triangulation set is less than 20%.

9 Implementations

The approaches described above may be used with a variety of free-space transmission techniques. For example, radio-frequency transmissions may be emitted from agents and received at the neighbors, with these radio frequency transmissions explicitly encoding or implicitly identifying the transmitting station. In some examples, a distance may be estimated based on a signal strength of the received transmission. In some examples a direction of arrival may be determined using multiple receiving antennas. In some examples, agents transmit autonomously, while in other examples, they respond to triggering transmissions from other agents. Other types of transmissions, including acoustic (e.g., ultrasound) and optical transmissions may be used. For example, with acoustic transmissions, the propagation time may be used to estimate distance. In some examples, a combination of transmission technologies may be used, for example, with optical transmissions triggering acoustic transmissions from agents. Whatever the transmission technology used, each agent has a suitable receiver to receive transmissions from neighboring agents, and a suitable computation device to determine information related to relative location of the neighboring agents based on the received transmission.

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of data processing graphs. The modules of the program (e.g., elements of a data processing graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

Additional embodiments and/or detailed description of aspects of the above-described embodiments can be found in the following published documents, the contents of which are included in U.S. Provisional Application Ser. No. 62/417,751, to which this application claims priority. The documents in the following list are incorporated herein by reference.

Sam Safavi, Usman Khan. "An opportunistic linear-convex algorithm for localization in mobile robot networks." *IEEE Transactions on Robotics*, vol. 33, issue 4, April 2017.

Sam Safavi, Usman Khan. "Localization in mobile networks via virtual convex hulls." *IEEE Transactions on Signal and Information Processing over Networks*, vol. PP, issue 99, February 2017.

Sam Safavi, Usman Khan. "A distributed range-based algorithm for localization in mobile networks." *Asilomar Conference on Signals, Systems and Computers*, November 2016.

Sam Safavi, Usman Khan. "On the convergence of time-varying fusion algorithms: Application to localization in dynamic networks." *IEEE 55th Conference on Decision and Control*, December 2016.

It is to be understood that the foregoing description is intended to illustrate and not to limit the scope of the invention.

What is claimed is:

1. A method for localization of a first agent in a network including a plurality of agents, the plurality of agents including a plurality of mobile agents and one or more beacons located at known locations, the method comprising:
    performing a procedure including,
    receiving transmissions from a plurality of neighboring agents;
    processing the transmissions to determine information related to a relative location of the first agent and each neighboring agent of the plurality of neighboring agents;
    determining, based on the information related to the relative location of the first agent and each neighboring agent, that the first agent is within one or more proximity regions; and
    updating an estimated location of the first agent based on the information related to a relative location of the first agent and each neighboring agent.

2. The method of claim 1 further comprising determining that a number of neighboring agents in the plurality of neighboring agents exceeds a threshold required to form the one or more proximity regions.

3. The method of claim 1 wherein the information related to the relative location of the first agent and each neighboring agent includes distance information.

4. The method of claim 1 wherein the information related to the relative location of the first agent and each neighboring agent includes directional information.

5. The method of claim 1 wherein each proximity region is formed as a convex hull formed according to locations of three or more agents of the plurality of neighboring agents.

6. The method of claim 1 further comprising repeatedly performing the procedure until an error threshold is met.

7. The method of claim 1 further comprising maintaining, at each mobile agent, an estimate of a direction and distance traveled location relative to a previous location.

8. The method of claim 7 wherein the previous location is an initial location.

9. The method of claim 1 wherein at least one of the proximity regions is determined based on a location of a first neighboring agent of the plurality of neighboring agents at a first time and a location of a second neighboring agent of the plurality of neighboring agents at a second time.

10. The method of claim 1 wherein at least one agent of the plurality of neighboring agents is a beacon.

11. The method of claim 1 wherein determining whether the first agent is included in one or more proximity regions includes determining barycentric coordinates of the first agent in the one or more proximity regions.

12. The method of claim 1 wherein the one or more beacons consists of a single beacon.

13. The method of claim 1 wherein the one or more proximity regions includes a plurality of proximity regions.

14. The method of claim 1 wherein at least some beacons of the one or more beacons is located at a fixed location.

15. A method for localization of a first agent in a network including a plurality of agents, the plurality of agents including a plurality of mobile agents and one or more beacons located at known locations, the method comprising: performing a procedure including,
receiving transmissions from a plurality of neighboring agents;
processing the transmissions to determine information related to a relative location of the first agent and each neighboring agent of the plurality of neighboring agents;
determining, based on the information related to the relative location of the first agent and each neighboring agent, that the first agent is within one or more proximity regions; and
updating an estimated location of the first agent based on the information related to a relative location of the first agent and each neighboring agent,
wherein the updating an estimated location of the first agent includes performing a linear update operation.

16. The method of claim 15 wherein the linear update operation includes a linear-convex combination of the information related to a relative location of the first agent and each neighboring agent.

\* \* \* \* \*